(12) United States Patent
Huang

(10) Patent No.: US 12,213,450 B2
(45) Date of Patent: Feb. 4, 2025

(54) DEVICE AND METHOD FOR CONTROLLING INTERACTIVE PERCEPTUAL EXPERIENCE IN DOG TRAINING

(71) Applicant: Quanzhou Purplebox Electronics Co., Ltd., Fujian (CN)

(72) Inventor: Zhican Huang, Fujian (CN)

(73) Assignee: Quanzhou Purplebox Electronics Co., Ltd., Fujian (CN)

( * ) Notice: Subject to any disclaimer, the term of this patent is extended or adjusted under 35 U.S.C. 154(b) by 92 days.

(21) Appl. No.: 18/322,700

(22) Filed: May 24, 2023

(65) Prior Publication Data
US 2024/0260542 A1 Aug. 8, 2024

(30) Foreign Application Priority Data
Feb. 3, 2023 (CN) .......................... 202310091825.8

(51) Int. Cl.
*A01K 15/02* (2006.01)
*G08B 6/00* (2006.01)

(52) U.S. Cl.
CPC .............. *A01K 15/021* (2013.01); *G08B 6/00* (2013.01)

(58) Field of Classification Search
CPC .... A01K 15/021; A01K 27/009; G08C 17/02; G08B 6/00
See application file for complete search history.

(56) References Cited

U.S. PATENT DOCUMENTS

| | | | |
|---|---|---|---|
| 8,260,431 B2* | 9/2012 | Kim ..................... | A01K 15/022 607/30 |
| 9,668,459 B2* | 6/2017 | Bonge, Jr. ............... | G01S 5/011 |
| 9,675,051 B2* | 6/2017 | Bonge, Jr. ............ | A01K 15/023 |
| 10,136,618 B2* | 11/2018 | Bonge, Jr. ................. | G06F 8/65 |
| 10,159,219 B2* | 12/2018 | Van Curen ........... | A01K 15/022 |
| 10,238,092 B2* | 3/2019 | Bonge, Jr. .............. | G16H 40/67 |
| 10,349,631 B2* | 7/2019 | Bonge, Jr. ............... | G01S 19/16 |
| 12,048,290 B1* | 7/2024 | Feng ..................... | A01K 15/022 |
| 2017/0202186 A1* | 7/2017 | Bonge, Jr. ............ | G08B 21/182 |
| 2020/0015456 A1* | 1/2020 | Van Curen ........... | A01K 15/022 |
| 2022/0053736 A1* | 2/2022 | Xiao ..................... | A01K 15/021 |

* cited by examiner

*Primary Examiner* — John A Tweel, Jr.
(74) *Attorney, Agent, or Firm* — Cooper Legal Group, LLC

(57) ABSTRACT

The present invention relates to the technical field of dog training devices, and provides a device and method for controlling interactive perceptual experience in dog training, the device comprising a receiver and a transmitter, wherein the receiver comprises a fixed device, a training output device provided on the fixed device, a first communication module and a first microprocessor, and the transmitter is a hand-held remote-control perceiving device capable of perceiving an operation, and the remote-control perceiving device comprises a housing, a second microprocessor provided on the housing, a second communication module and a perception input module, and the perception input module performs training output operation by means of press strengths or grip strengths with different intensities. The present invention solves the problem that when the existing dog training device is used, the operation is too simple for the dog trainer to perceive the training intensity experienced by the pet dog.

15 Claims, 13 Drawing Sheets

DEVICE AND METHOD FOR CONTROLLING INTERACTIVE PERCEPTUAL EXPERIENCE IN DOG TRAINING

CROSS-REFERENCE TO RELATED APPLICATIONS

The instant application claims priority to Chinese Patent Application 202310091825.8, filed on Feb. 3, 2023, which is incorporated herein by reference.

TECHNICAL FIELD

The present invention relates to the field of dog training devices, in particular to a device and method for controlling interactive perceptual experience in dog training.

BACKGROUND

The existing dog training devices on the market mostly perform unidirectional control training, and it is impossible to know whether a receiver receives a training signal and whether it actually performs training action. There are also a small number of dog training devices which have a bidirectional communication mechanism. The receiver receives an operation signal of a transmitter and sends a response signal to the transmitter to confirm receipt. The transmitter receives the response signal to make a light or display indication, which, however, is only a visual confirmation. At the same time, the owner has no knowledge of the training intensity of the pet dog during training, i.e., the degree of intensity of the training action performed on the pet dog cannot be perceived and experienced.

SUMMARY

Therefore, in view of the above-mentioned problems, the present invention provides a device and method for controlling interactive perceptual experience in dog training, which achieves corresponding perception of the graded intensity of a training action received by a pet dog according to the graded intensity of a training input operation during a training operation, so that the perception of the input operation is different according to different training intensities, from the original visual confirmation to the present interactive perception of vision, hearing and touch, etc.

In order to solve this technical problem, the present invention adopts the following solutions: a device for controlling interactive perceptual experience in dog training, comprising a receiver and a transmitter, wherein the receiver comprises a fixed device wearable on the neck of a pet dog, a training output device provided on the fixed device, a first communication module and a first microprocessor, and the transmitter is a hand-held remote-control perceiving device capable of perceiving an operation comprising a housing, a second microprocessor provided on the housing, a second communication module and a perception input module, wherein the perception input module performs a training output operation by means of press strengths or grip strengths with different intensities, the second microprocessor receives information on the press strengths or the grip strengths with the different intensities of the perception input module and converts the information into a training output signal of corresponding intensity; the second microprocessor communicates the training output signal of corresponding intensity input by the perception input module to the first communication module of the receiver via the second communication module; the first communication module receives the training output signal sent by the second microprocessor and sends the training output signal to the first microprocessor; and the first microprocessor controls according to the received training output signal, the training output device to perform training output operation of corresponding intensity on the pet dog.

Further, the receiver further comprises a motion sensor provided in the training output device and configured to monitor whether the training output device performs training output of electrostatic pulses, vibrations and warning sounds, and to send detection information to the first microprocessor in real time, and the first microprocessor feeds back the detection information about the motion sensor to the second microprocessor of the transmitter through a communication connection between the first communication module and the second communication module of the transmitter.

Further, the remote-control perceiving device further comprises a second vibration output module, wherein the second vibration output module is provided in the housing, the second vibration output module is provided with a multi-grade vibration output mode corresponding to the press strength or the grip strength with the different intensities of the perception input module, and after receiving detection information from the motion sensor fed back by the receiver, the second microprocessor controls the vibration output module to output a corresponding grade of vibration inductance according to the intensity of the training output signal.

Further, the vibration output module comprises a driving circuit and a cylindrical vibration motor, and the second microprocessor module adjusts the rotation speed of the cylindrical vibration motor via the driving circuit to output different grades of vibration inductance.

Further, the perception input module comprises one or more combinations of a grip input mechanism, a pressure input mechanism, and a multi-grade adjustment key input mechanism.

Further, the grip input mechanism comprises a grip sensor and a press plate, the side of the housing is provided with a slot for accommodating the grip sensor and the press plate, the grip sensor is embedded on the slot of the side of the housing, the press plate is attached outside the grip sensor and is covered on the slot of the side of the housing, and the grip sensor is connected to an input end of the second microprocessor.

Further, the pressure input mechanism comprises a pressure sensor and a second press plate, the side of the housing is provided with a second slot for accommodating the pressure sensor and the second press plate, the pressure sensor is embedded on the second slot of the side of the housing, the second press plate is attached outside the pressure sensor and is covered on the second slot of the side of the housing, and the pressure sensor is connected to an input end of the second microprocessor.

Further, the multi-grade adjustment key input mechanism comprises a key support, a key, an elastic mechanism, a support plate, a stop block and a drive mechanism, wherein the key is provided on a PCB board and the key is connected to an input end of the second microprocessor, a part of the key support protrudes from the surface of the housing and passes through an upper surface of the housing, the bottom of the key support is provided on the key of the PCB board via the elastic mechanism so that the key support is capable of pressing the operation and control key, the bottom of the elastic mechanism is provided with a support column movably passing through the PCB board, and the support plate is provided in the housing below the support column of the elastic mechanism to support the support column, the bottom surface of the support plate is provided with a slope, the stop block is movably and transversely provided in the housing at a lower part below the support plate, an output shaft of the drive mechanism is connected to and drives the stop block to move horizontally and transversely in the housing, so that the movement of the stop block drives the support plate to be lifted or lowered to adjust the compression strength of the elastic mechanism, so that when a key support is pressed to perform a training output operation input, there will be different hand feels, and the drive mechanism is connected to and controlled by the second microprocessor.

Further, the drive mechanism is a screw motor.

Further, the upper surface of the stop block is provided with a second slope opposite to and adapted to the slope of the bottom surface of the support plate.

Further, the training output device comprises an electrostatic pulse, a vibration, a warning sound, or an ultrasonic stimulus to allow the pet dog to correct an undesirable habit.

Further, the receiver further comprises an electrostatic pulse output module, wherein the electrostatic pulse output module is connected to a training output device, an output end of the electrostatic pulse output module is connected to a first microprocessor input end, the electrostatic pulse output module acquires an electrostatic pulse current value of the current electrostatic pulse shock column to be compared with a preset idle current threshold value by detecting whether the electrostatic pulse shock column is in contact with the skin to cause different loads, and the electrostatic pulse training is successful if the electrostatic pulse current value of the current electrostatic pulse shock column is greater than the preset idle current threshold value.

Further, the remote-control perceiving device comprises a display connected to the second microprocessor.

A method for controlling interactive perceptual experience in dog training based on the device for controlling interactive perceptual experience in dog training, comprising: providing a receiver and a transmitter, wherein the receiver comprises a fixed device wearable on the neck of a pet dog, a training output device provided on the fixed device, a first communication module and a first microprocessor, wherein the training output device is provided on the fixed device, and the transmitter is a hand-held remote-control perceiving device capable of perceiving an operation, and the remote-control perceiving device comprises a housing, a second microprocessor provided on the housing, a second communication module and a perception input module;
- a training intensity output is configured, wherein the training output operation of the training output device is configured with a plurality of training output modes with different intensity grades; and
- a training output signal is configured for a perception mode, wherein a perception input module of the training output operation is set to perform the training output operation with multi-grade press strengths with different intensities or multi-grade grip strengths with different intensities matching each graded intensity output of the training intensity output, and a second microprocessor converts received information about the press strength or the grip strength with different intensities of the perception input module into a training output signal with a corresponding intensity, the second microprocessor communicates the training output signal of the corresponding intensity input by the perception input module to the first communication module of the receiver via the second communication module; the first communication module receives a training output signal sent by the second microprocessor and sends the training output signal to the first microprocessor, and the first microprocessor controls according to the received training output signal, the training output device to perform training output operation of corresponding intensity on the pet dog, so that a dog trainer is capable of perceiving that a training output of corresponding intensity is desired to be performed on the pet dog through an input operation.

Further, the receiver further comprises a motion sensor, and the remote-control perceiving device further comprises a vibration output module, wherein the motion sensor monitors in real time whether the training output device performs training output and sends detection information to the first microprocessor, and the first microprocessor feeds back the detection information about the motion sensor to the second microprocessor of the transmitter through communication connection between the first communication module and the second communication module of the transmitter; after receiving the detection information of the motion sensor fed back by the receiver, the second microprocessor controls the vibration output module to output a vibration inductance of a corresponding grade according to the intensity of the training output signal so that the dog trainer is capable of feeling the training output having the same intensity as that of the pet dog.

By means of the foregoing technical solution, the present invention has the following advantageous effects: by the training output operation of the training output device is configured with a plurality of training output modes of different intensity grades; providing a hand-held remote-control perceiving device capable of perceiving an operation, inputting a training output operation using a perception input module, and configuring the perception input module to perform the training output operation with multi-grade press strengths with different intensities or multi-grade grip strengths with different intensities matching each graded intensity output of the training intensity output, so that when a pet dog is pre-trained, the training output operation can be performed by using the perception input module to perform press strength or grip strength with different intensities grades in a direct experiential manner; the second microprocessor converts the press strength or grip strength information with different intensities input by the perception input module into a training output signal with a corresponding intensity according to the received information, and then the second microprocessor communicates the training output signal with the corresponding intensity input by the perception input module to the first communication module of the receiver via the second communication module, and the first microprocessor of the receiver controls the training output device to perform a training output operation with a corresponding intensity on the pet dog according to the received training output signal, so that the dog trainer is capable of perceiving the corresponding intensity of training output intended for the pet dog through the input operation, and realize corresponding perception of the graded intensity of training action received by the pet dog through the training operation according to the graded intensity of the training input operation, the training intensity is different and the perception of the input operation is also different, the feeling of a dog can always be perceived and the trainer can enjoy the time of training the dog. By means of further setting, i.e., providing a second vibration output module on the remote-control perceiving device, providing a motion sensor on the receiver to monitor in real time whether the electrostatic pulse, vibration and warning sound training output execute training output and sending detection information to the first microprocessor, and the first microprocessor feeding back the detection information about the motion sensor to the second microprocessor of the transmitter through a communication connection between the first communication module and the second communication module of the transmitter, and after receiving the detection information of the motion sensor fed back by the receiver, the second microprocessor controls the second vibration output module to output a vibration inductance of a corresponding grade according to the intensity of the training output signal so that the dog trainer feels a vibration of the same intensity as that of the pet dog, and further enhances the perception experience of the dog trainer; the perception input module is respectively provided with a grip input mechanism, a pressure input mechanism and a multi-grade adjustment key input mechanism, so that the dog trainers operate same in various ways and it is more convenient for them to use; the multi-grade adjustment key input mechanism adjusts the elasticity of the elastic mechanism in such a way that the drive mechanism drives the stop block to drive the support plate to be raised or lowered, so that when the key support presses the key, perception input of multiple grades of different intensities is realized, which changes the problem that the traditional key cannot realize pressing input of multiple grades of different intensities, and realizes that the touch of the key is automatically adjusted according to the set training intensity, so that when the training intensity is small, the touch of the key becomes light; when the training intensity is great, the key touch becomes heavy and the structure is simple and reasonable, which it can be widely applied.

DESCRIPTION OF EMBODIMENTS

Figure 1:
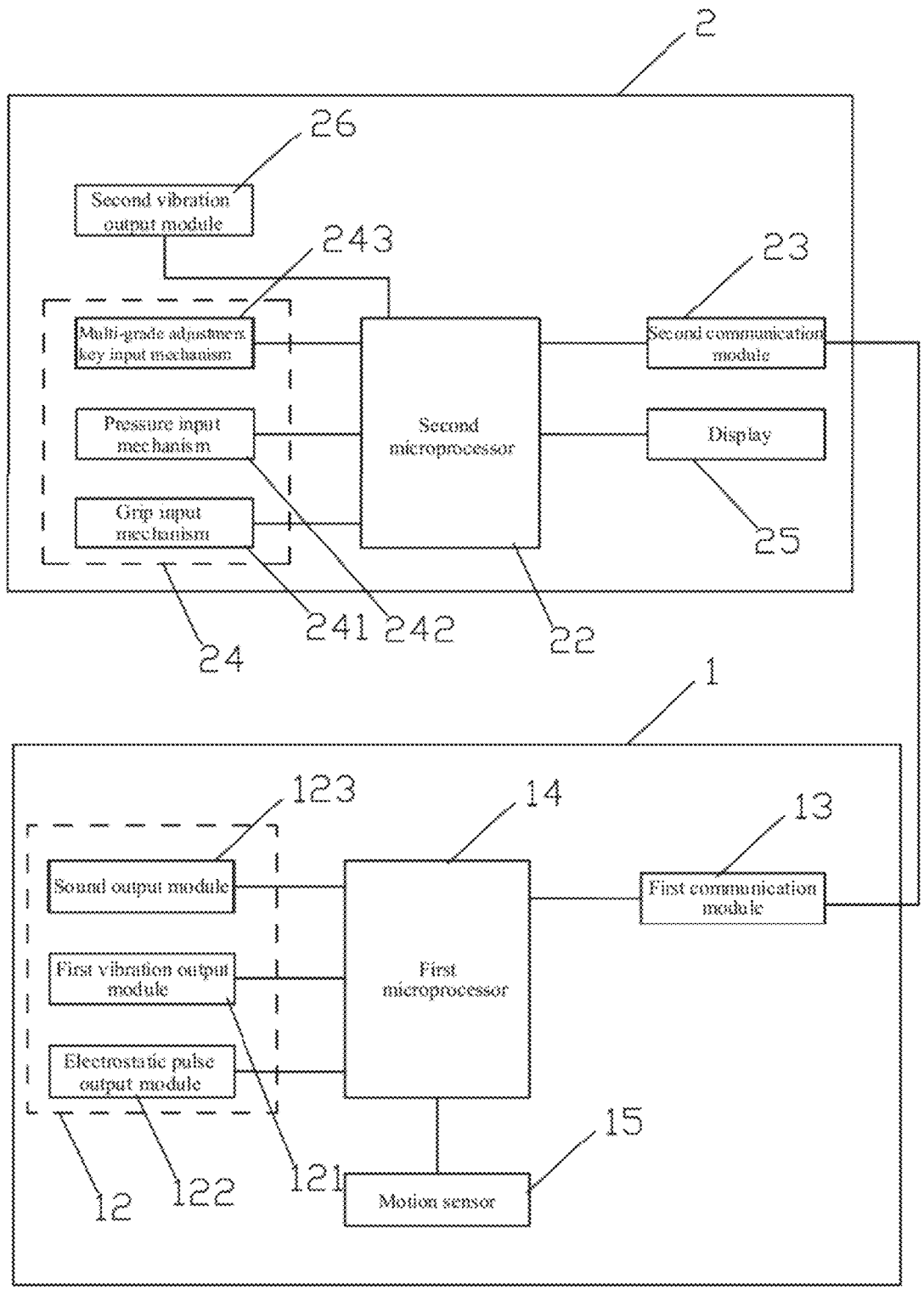
FIG. 1 is a schematic block diagram showing an exercise control apparatus according to an embodiment of the present invention.
Figure 2:
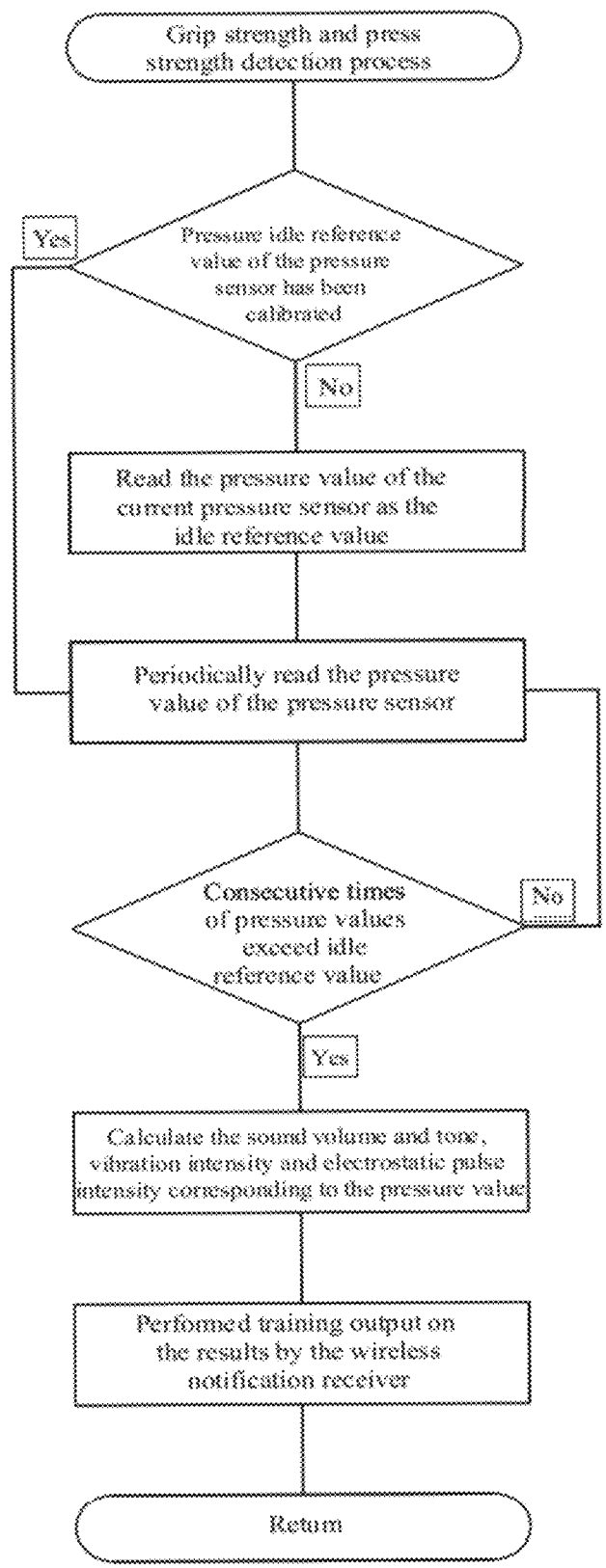
FIG. 2 is an operational flow diagram showing a transmitter grip strength and press strength operation according to an embodiment of the present invention.

The present invention will now be further described with reference to the accompanying drawings and detailed description.

With reference to FIGS. 1-13, a preferred device for controlling interactive perceptual experience in dog training of the present invention comprises a receiver 1 and a transmitter 2, wherein the receiver 1 comprises a fixed device 11 wearable on the neck of a pet dog, a training output device 12 provided on the fixed device 11, a first communication module 13, a first microprocessor 14 and a motion sensor 15, the training output device 12 comprises a first vibration output module 121, an electrostatic pulse output module 122 and a sound output module 123, and the transmitter 2 is a hand-held remote-control perceiving device capable of perceiving an operation. The remote-control perceiving device comprises a housing 21, a second microprocessor 22, a second communication module 23, a perception input module 24, a display 25 and a second vibration output module 26 which are provided on the housing 21; the perception input module 24 comprises a grip input mechanism 241, a pressure input mechanism 242 and a multi-grade adjustment key input mechanism 243; the grip input mechanism 241, the pressure input mechanism 242 and the multi-grade adjustment key input mechanism 243 of the perception input module 24 are all provided with press strength or grip strength at different intensity grades to perform a training output operation; the second microprocessor 22 receives information on the press strengths or the grip strengths with the different intensities of the perception input module 24 and converts the information into a training output signal of corresponding intensity; the second microprocessor 22 communicates the training output signal of corresponding intensity input by the perception input module 24 with the first communication module 13 of the receiver 1 via the second communication module 23; the first communication module 13 receives the training output signal sent by the second microprocessor 22 and sends the training output signal to the first microprocessor 14; according to the received training output signal, the first microprocessor 14 controls the first vibration output module 121, the electrostatic pulse output module 122 or the sound output module 123 of the training output device 12 to perform a training output operation of a corresponding intensity on a pet dog, and the motion sensor 15 is provided in the training output device 12 to monitor whether the training output device 12 executes training output and sends detection information to the first microprocessor 14 in real time; the first microprocessor 14 feeds back the detection information about the motion sensor 15 to the second microprocessor 22 of the transmitter 2 via the communication connection between the first communication module 13 and the second communication module 23 of the transmitter 2; the second vibration output module 26 comprises a driving circuit and a cylindrical vibration motor; the second vibration output module 26 is provided with a multi-grade vibration output mode corresponding to perceiving the press strength or grip strength of different intensities of the input module 24; and the second microprocessor module 22 adjusts the rotation speed of the cylindrical vibration motor via the driving circuit to output different grades of vibration inductance; after receiving the detection information of the motion sensor 15 fed back by the receiver 1, the second microprocessor 22 controls the second vibration output module 26 to output a corresponding grade of vibration inductance according to the intensity of the training output signal; the display 25 is connected to the second microprocessor 22; and the display 25 uses a TFT liquid crystal display screen to display the contents, such as the electric quantity of the receiver and the transmitter, the sound volume and tone of the receiver, the vibration strength and the electrostatic pulse strength in real time.

Figure 3:
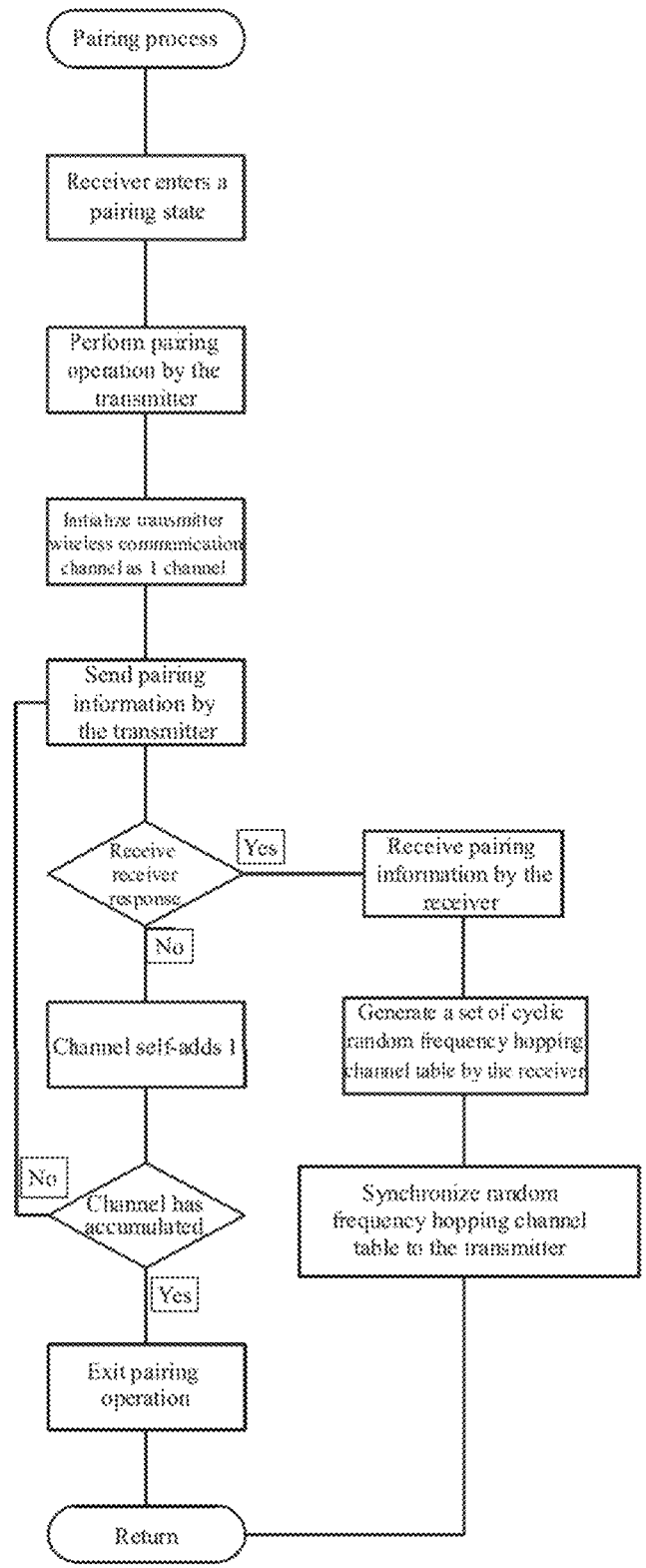
FIG. 3 is an operational flow diagram showing a transmitter and a receiver pairing according to an embodiment of the present invention.
Figure 5:
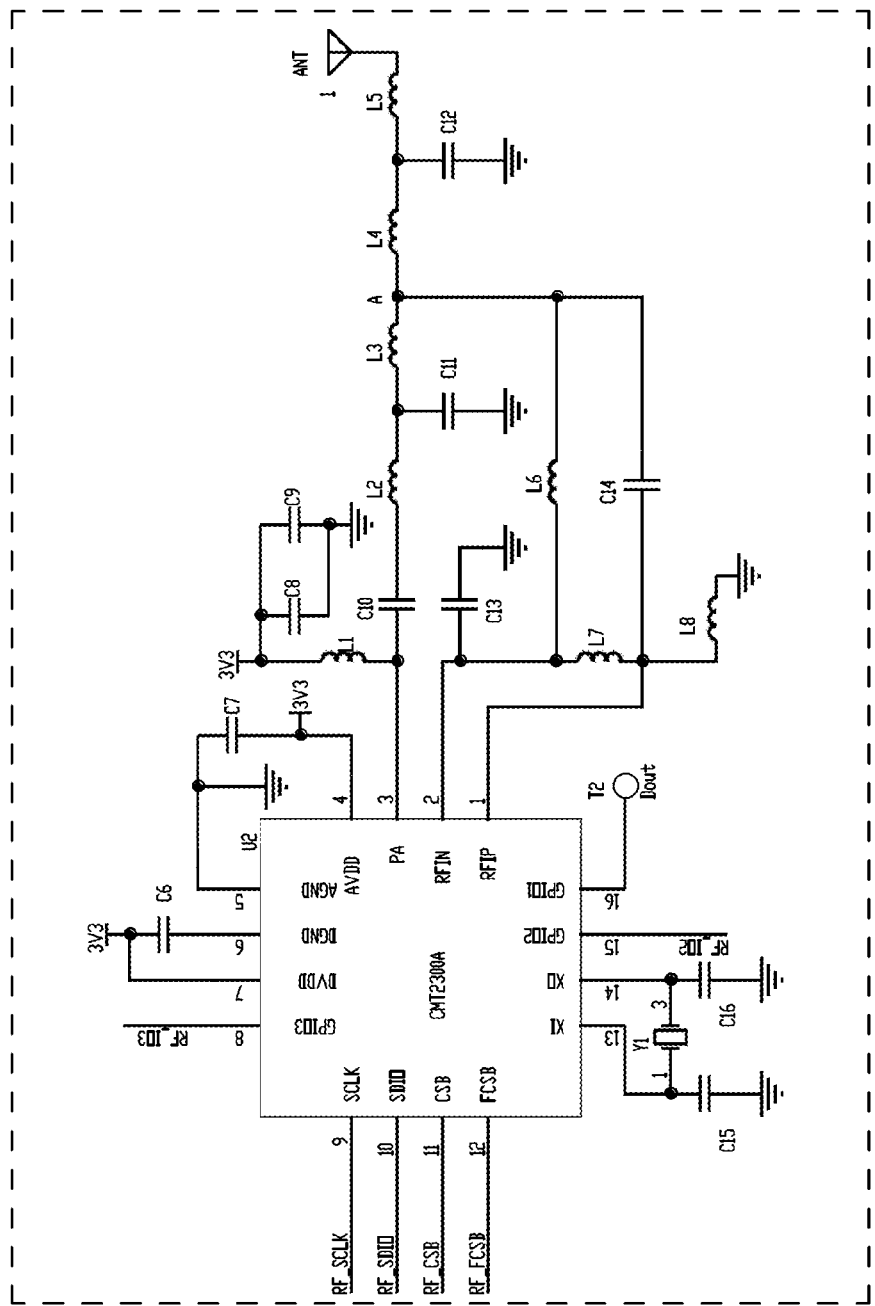
FIG. 5 is a schematic circuit diagram showing a wireless bidirectional communication module according to an embodiment of the present invention.

With reference to FIGS. 3 and 5, the first communication module of the receiver and the second communication module of the transmitter are both wireless bidirectional communication modules, and the first communication module of the receiver and the second communication module of the transmitter need to pair first, and the address of each transmitter is unique; when pairing, the receiver enters a pairing receiving state; at this moment, a combination pairing key of the transmitter is triggered to transmit a pairing signal; according to the transmission opportunity, pairing information is transmitted from channel 1 to information N in sequence; and after the receiver receives the pairing signal of the transmitter, the receiver generates a set of circular random frequency hopping channel tables according to the received address of the transmitter, and then the pairing process ends. According to the circuit principle of the wireless bidirectional communication module, the wireless transceiver chip adopts CMT2300A which is an OOK/(G) FSK radio frequency transceiver which is ultra-low in power consumption, high in performance and applicable to various wireless applications of from 140 to 1020 MHz, and L1 is a choke inductor; C6-C9 are power supply decoupling capacitors used to reduce the influence of PA output on power supply and make appropriate adjustment according to actual application requirements; C10 is a DC blocking capacitor, and forms a resonance with part of the inductance of L2 at the working frequency point to play a harmonic suppression effect; point A identified by the circuit diagram is a direct connection point, and the impedance at this point is 50Ω; L2, C11 and L3 constitute a TX matching network to realize PA output and direct connection point impedance matching. C13, L8, C14, L6 and L7 constitute an RX balun matching network, realizing the matching of the input impedance of the receiver and the direct connection point, and enabling the received signal to arrive at the differential input ports RFIP and RFIN with the same amplitude and 180 degrees of phase difference; L4, C12 and L5 are T-type low-pass filtering matching networks of 50Ω to 50Ω; Y1 recommends the use of 26 MHz crystals with frequency tolerance of ±20 ppm, and the acceptable crystal frequency tolerance depends on the requirements for communication system of user product, such as frequency, channel and bandwidth; C15 and C16 are crystal load capacitances. Dout is a pass-through test point that tests the receive sensitivity of CMT2300A. Rf_SCLK, RF_SDIO, RF_CSB and RF_FCSB are communication interfaces between the first microprocessor 14 or the second microprocessor 22 and the CMT2300A, and RF_IO2 and RF_IO3 trigger ports for the CMT2300A to send and receive data successfully.

The sound output module 123 of the training output device 12 comprises a driving circuit and a passive buzzer; the first microprocessor adjusts the output frequency and duty ratio of the passive buzzer via the driving circuit to control the size and pitch of the sound, and generates weak vibration when outputting the sound, and then monitors via the motion sensor 15 to monitor whether the output of the sound training action is actually executed; and the monitored final result is fed back to the second microprocessor 22 of the transmitter 2 via the communication connection between the first communication module 13 and the second communication module 23 of the transmitter 2 for operation confirmation prompt. The first vibration output module 121 of the training output device 12 comprises a driving circuit and a cylindrical vibration motor; the first microprocessor adjusts the rotation speed of the cylindrical vibration motor via the driving circuit to achieve different vibration inductance outputs; the cylindrical vibration motor outputs to generate vibration and then monitors via the motion sensor 15; whether the electrostatic pulse, vibration and warning sound training actions are actually executed is monitored; and the monitored final result is fed back to the second microprocessor 22 of the transmitter 2 via the communication connection between the first communication module 13 and the second communication module 23 of the transmitter 2 for operation confirmation prompt. The electrostatic pulse output module 122 of the training output device 12 comprises a transformer boosting circuit and a current detection circuit; the first microprocessor adjusts the intensity of the electrostatic pulse via the transformer boosting circuit; when the electrostatic pulse is output, the output current value is also sampled in real time for monitoring, and then is compared with preset idle current thresholds of different intensities, and it is considered that the execution is successful if it is greater than the preset idle current threshold; and the monitored final result is fed back to the second microprocessor 22 of the transmitter 2 for operation confirmation prompt via a communication connection between the first communication module 13 and the second communication module 23 of the transmitter 2.

Figure 6:
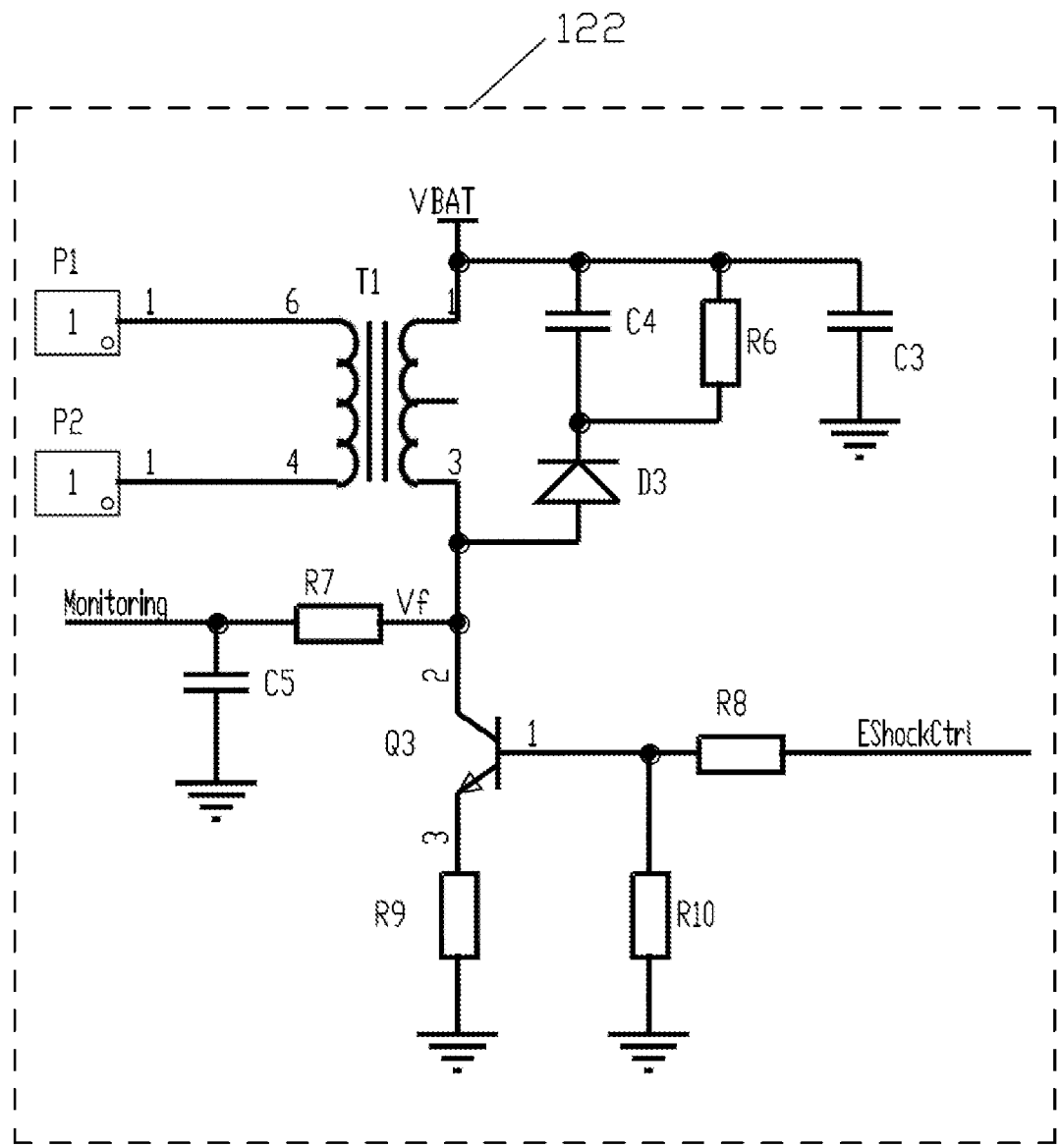
FIG. 6 is a schematic circuit diagram showing a receiver electrostatic pulse output module according to an embodiment of the present invention.

With reference to FIG. 6, according to the circuit principle of the electrostatic pulse output module 122 of the training output device 12 is as follows: the first microprocessor 14 port EShockCtrl outputs a fast high-level pulse; after being divided by resistors R8 and R10, the triode Q3 is driven to be in a conducting state; the boosting transformer T1 will boost the VBAT to a specified voltage; C3 is a power supply decoupling capacitor; R9 is a current sampling resistor and provides a reference voltage at point Vf; R7 is an isolation resistor; C5 is a filter capacitor; when the output ends of P1 and P2 contact the skin, the load changes; as a result of the change in the voltage at the Vf point, the first microprocessor 14 samples the change in the AD value at the Vf voltage point through the Monitoring and determines from this change whether there is contact with the dog's skin.

Figure 7:
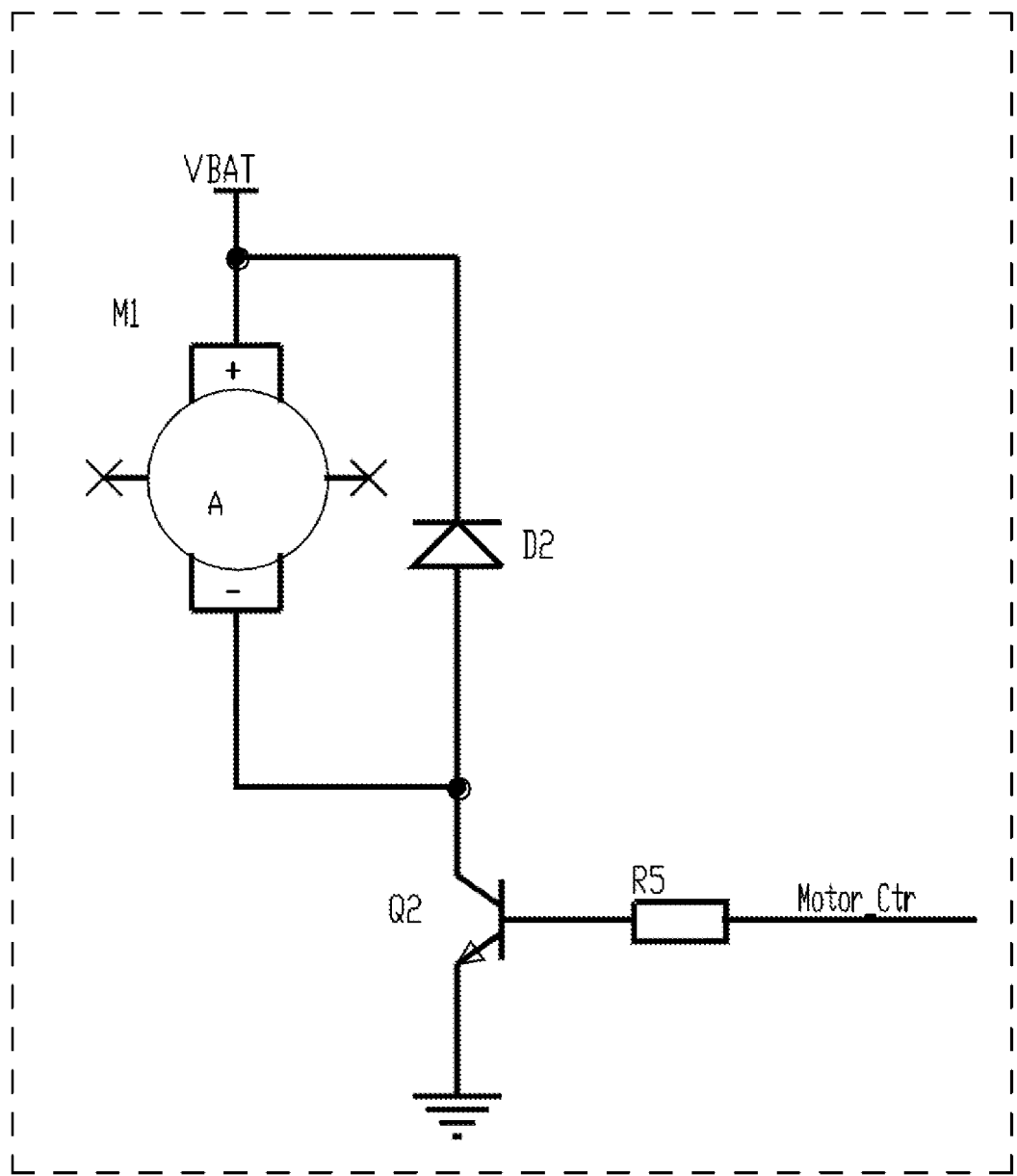
FIG. 7 is a schematic circuit diagram showing a vibration output module according to an embodiment of the present invention.

With reference to FIG. 7, the circuit principle of the vibration output module 121 of the training output device 12 and the second vibration output module 26 of the remote-control perceiving device is as follows: a port Motor_Ctr of the first microprocessor 14 or the second microprocessor 22 outputs a switch signal with a frequency of 1 KHz, and after limiting the resistance via the resistor R5, the driving triode Q2 is in a conducting state, driving the rotation of the cylindrical vibration motor M1, and adjusting the duty ratio of the frequency of 1 KHz to adjust the rotation speed of the motor, D2 is an "anti-phase" diode for protecting the driving triode Q2 from being broken by the back electromotive force of the internal inductance of the cylindrical vibration motor.

Figure 8:
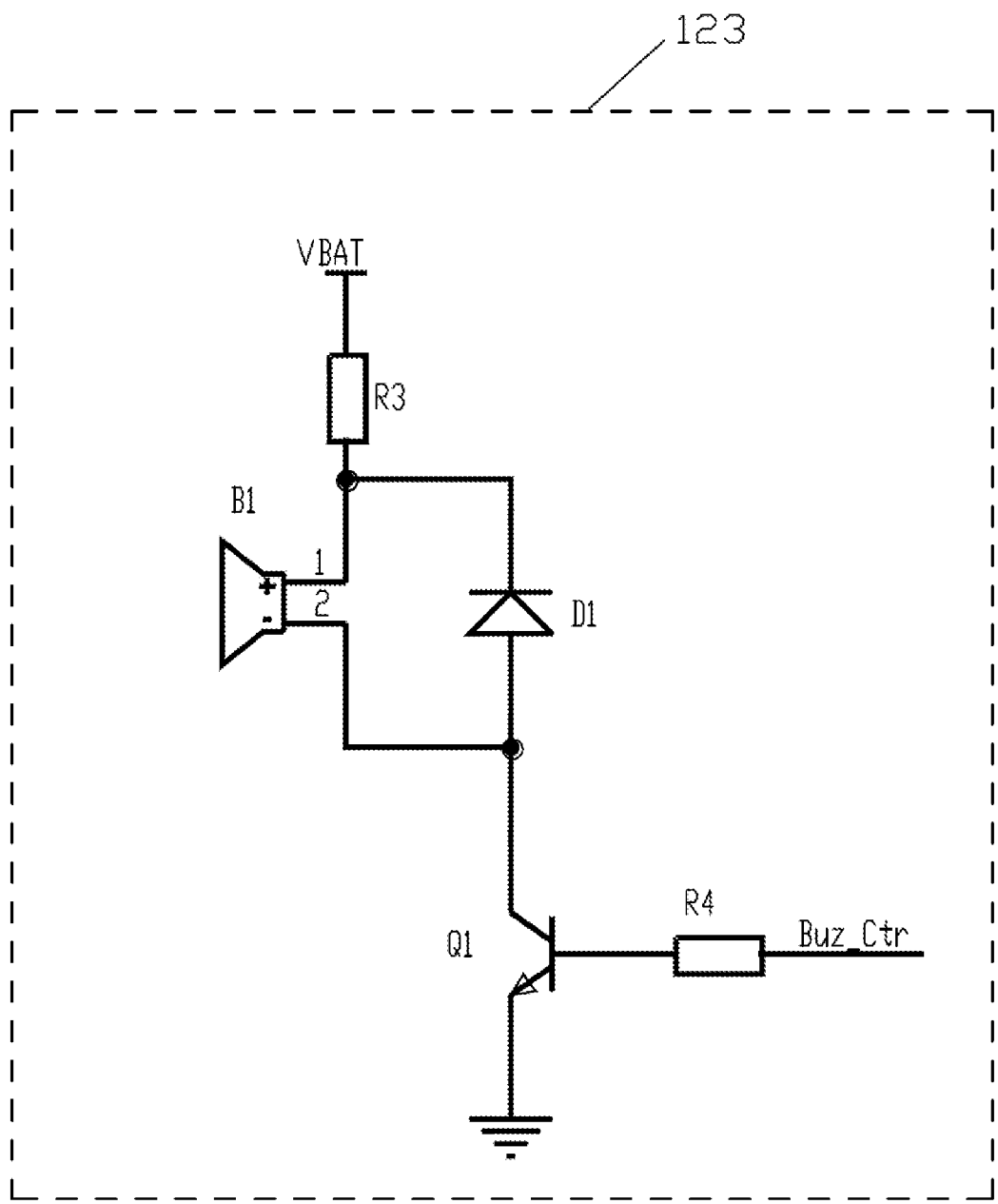
FIG. 8 is a schematic circuit diagram showing a sound output module according to an embodiment of the present invention.

With reference to FIG. 8, according to the circuit principle of the sound output module 123 of the training output device 12 is as follows: a port Buz_Ctr of the first microprocessor 14 outputs a switch signal with a frequency of 1 KHz-10 KHz, after a resistor is limited by R4, the triode Q1 is driven to be in a conductive state, the passive buzzer B1 is driven to be called, and the size and pitch of the sound are controlled by adjusting the output frequency and duty ratio, and D1 is a freewheeling diode and plays a protective role in preventing the buzzer from generating a high voltage to burn the buzzer.

Figure 9:
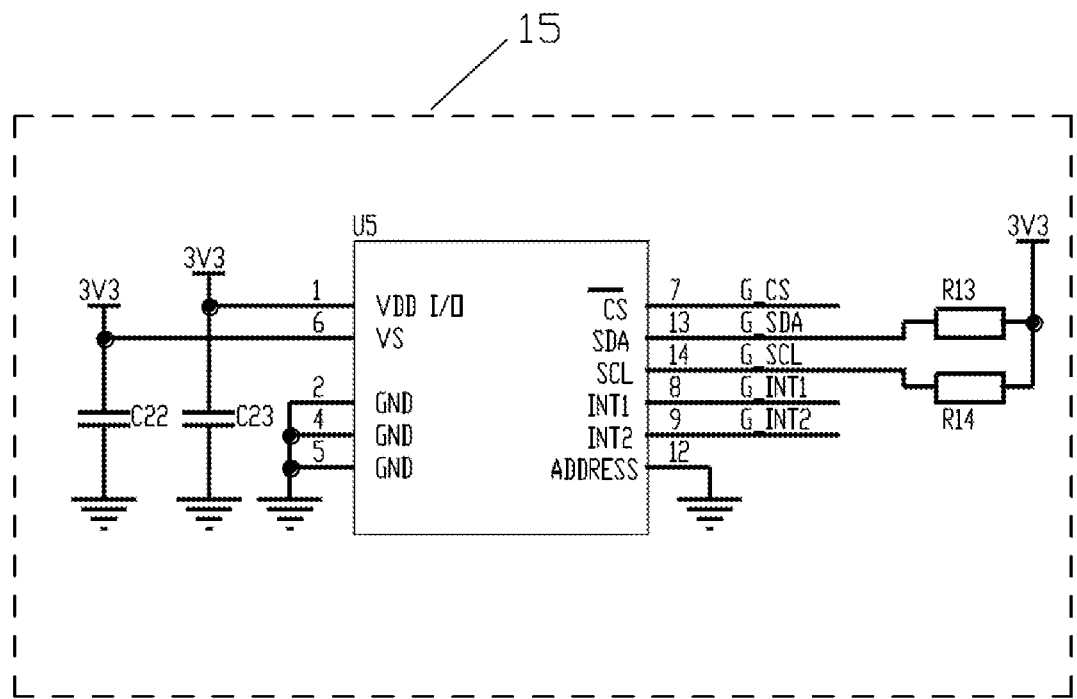
FIG. 9 is a schematic circuit diagram showing a motion detection module according to an embodiment of the present invention.

With reference to FIG. 9, according to the circuit principle of the motion sensor 15, ADXL345 from ADI Corporation is used as a motion sensor chip, which is a three-axis accelerometer with SPI and I2C digital output function using MEMS technology and has the features of being small, light and thin, ultra-low power consumption, variable range, high resolution and so on; the first microprocessor 14 uses an I2C mode to communicate with the motion sensor U5; R13 and R14 are pull-up resistors at a communication port; and C22 and C23 are power supply decoupling capacitors. G_CS is a chip select port of the motion sensor chip, G_SDA and G_SCL are I2C communication interfaces, and G_INT1 and G_INT2 provide various interrupt signals for automatic internal detection.

Figure 12:
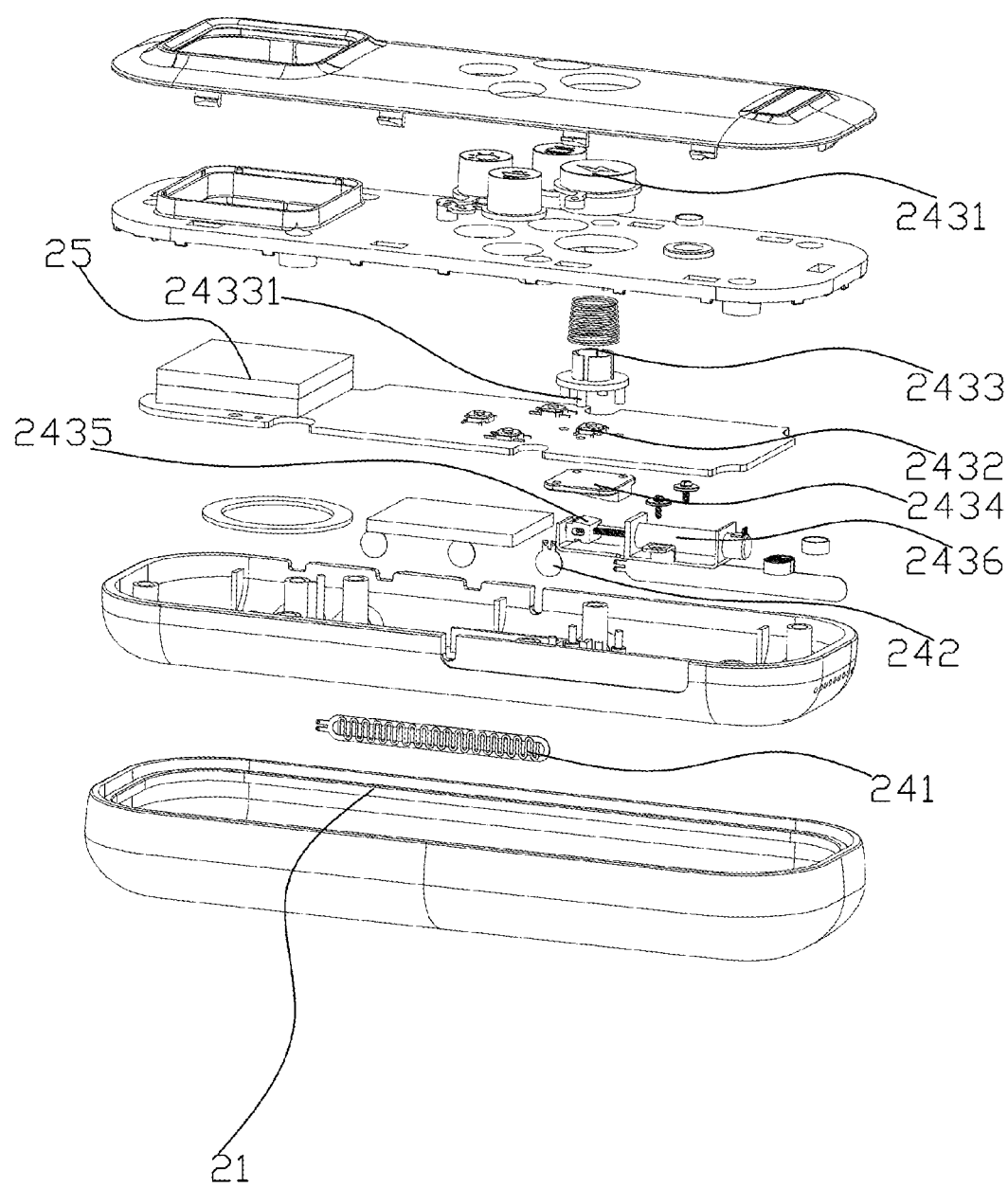
FIG. 12 is a 3D exploded view of a complete transmitter according to an embodiment of the present invention.
Figure 13:
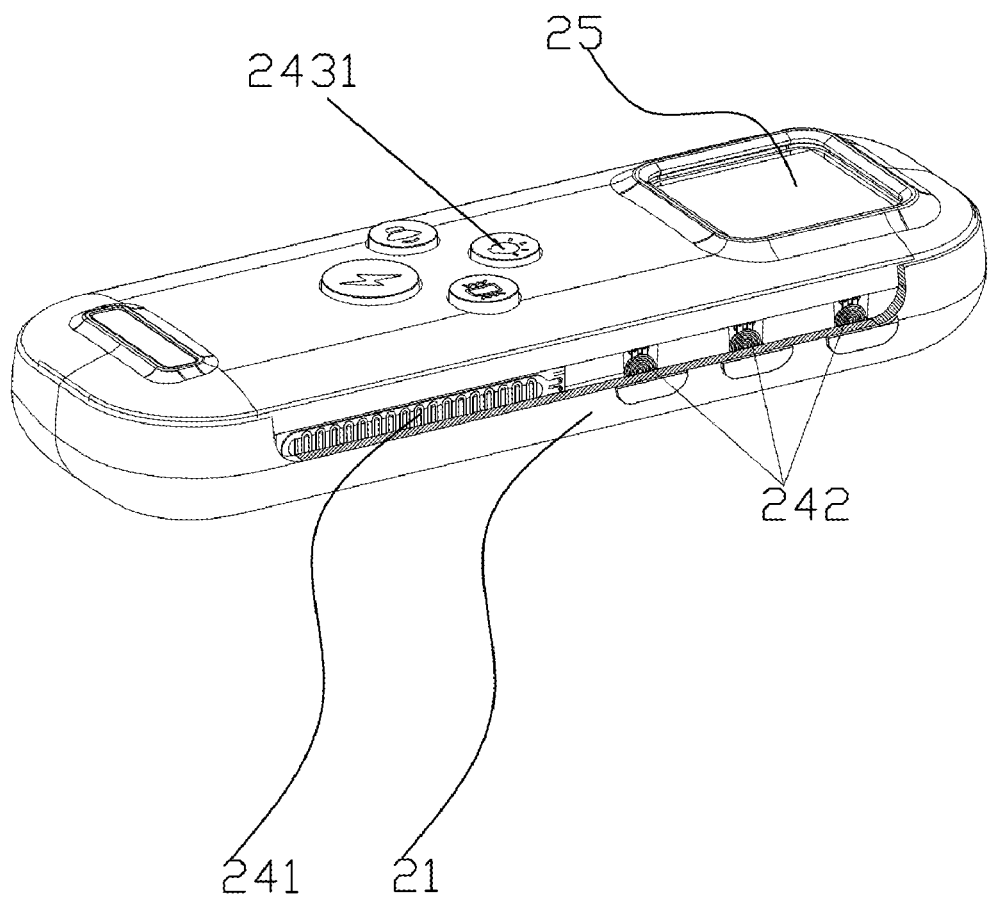
FIG. 13 is a schematic side cross-sectional view of a transmitter according to an embodiment of the present invention.

With reference to FIGS. 12 and 13, the perception input module 24 comprises a grip input mechanism 241, a pressure input mechanism 242 and a multi-grade adjustment key input mechanism 243, wherein the grip input mechanism 241 comprises a grip sensor and a press plate, a slot for accommodating the grip sensor and the press plate is provided on a side of the housing 21, the grip sensor is embedded on the slot on the side of the housing 21, the press plate is attached outside the grip sensor and is covered on the slot on the side of the housing, and the grip sensor is connected to an input end of the second microprocessor 22; the pressure input mechanism 242 comprises a pressure sensor and a second pressure plate, a side of the housing 21 is provided with a second slot for accommodating the pressure sensor and the second pressure plate, the pressure sensor is embedded on the second slot of the side of the housing 21, the second pressure plate is attached outside the pressure sensor and covers the second slot of the side of the housing 21, the pressure sensor is connected to an input end of the second microprocessor 22, and the multi-grade adjustment key input mechanism 243 comprises a key support 2431, a key 2432, an elastic mechanism 2433, a support plate 2434, a stop block 2435 and a drive mechanism 2436, wherein the key 2432 is provided on the PCB board, and the key 2432 is connected to an input end of the second microprocessor 22; the key support 2431 partially protrudes from the surface of the housing 21 and penetrates through the upper surface of the housing 21; the bottom of the key support 2431 is provided on the key 2432 of the PCB board via an elastic mechanism 2433 so that the key support 2431 can press the operation and control key 2432; the elastic mechanism 2433 comprises a damping spring and a base; the lower end of the damping spring is connected to the base, and the upper end of the damping spring is connected to the bottom of the key support 2431; the bottom of the base of the elastic mechanism 2433 is provided with a support column 24331 movably passing through the PCB plate; the support plate 2434 is provided inside the housing 21 and is located below the support column 24331 of the elastic mechanism 2433 to support the support column 24331; the bottom surface of the support plate 2434 is provided with a slope; the upper surface of the stop block 2435 is provided with a second slope which has an opposite slope amplitude and is adapted to the slope of the bottom surface of the support plate 2434; the stop block 2435 is provided in the lower part of the housing 21 below the support plate 2434 in a transversely movable manner; the drive mechanism 2436 is a screw rod motor; the output shaft of the drive mechanism 2436 is connected to and drives the stop block 2435 to move horizontally and transversely in the housing 21; the movement of the stop block 2435 drives the support plate 2434 to be raised or lowered to adjust the compression strength of the elastic mechanism 2433 to have different hand-feels when the key support 2431 is pressed to perform training output operation input, and the drive mechanism 2436 is connected to and controlled by the second microprocessor 22.

Figure 4:
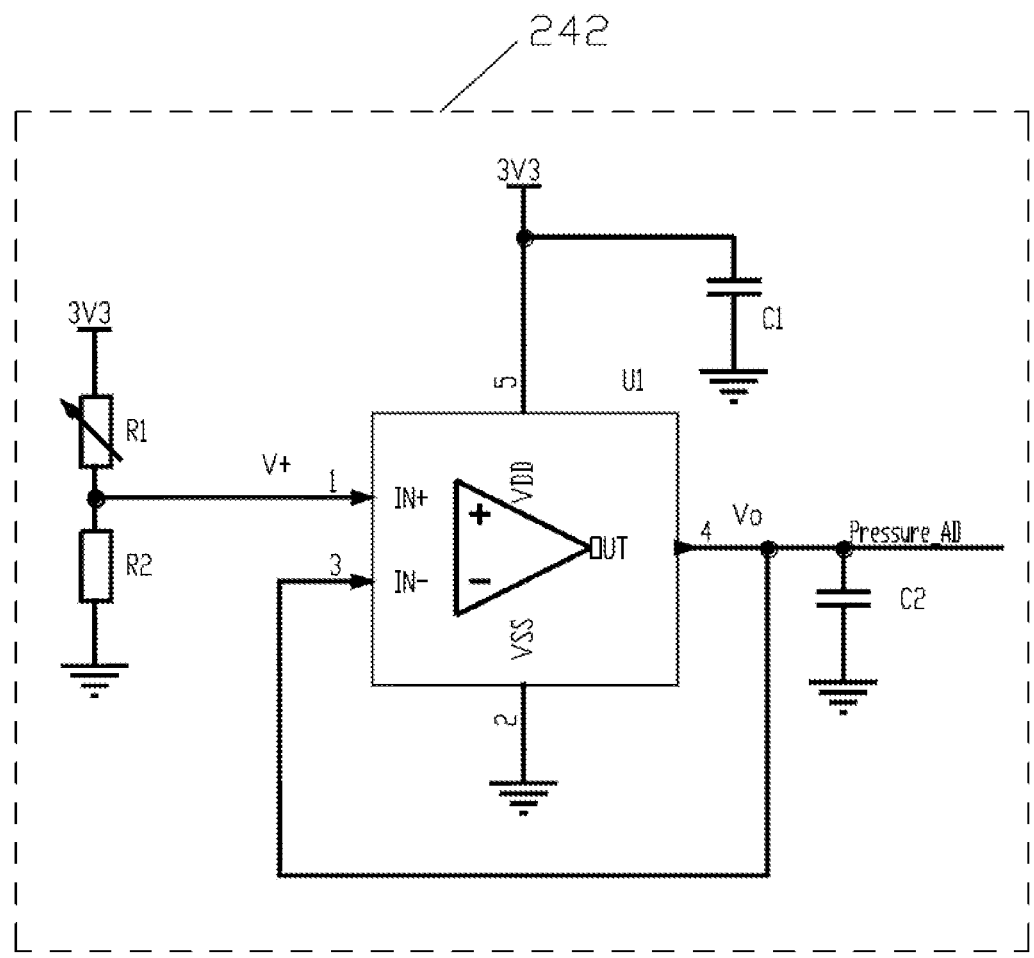
FIG. 4 is a schematic circuit diagram showing a transmitter pressure input mechanism according to an embodiment of the present invention.

With reference to FIG. 4, according to the circuit principle of the pressure input mechanism 242 of the perception input module 24: the pressure sensor R1 is connected in series with a fixed resistor R2 to measure the output voltage V+ at the two ends of the fixed resistor R2, C1 is a power supply decoupling capacitor, and C2 is an AD sampling filter capacitor; it is suggested that the value of fixed resistance R2 should be ⅓ to ½ of the value of sensor application resistance range. By selecting suitable fixed resistance R2, the pressure and output voltage can present a certain degree of approximate linear relationship within a certain pressure range. According to the impedance requirement of the circuit measured by the pressure sensor circuit, a voltage follower Vo=V+is added after the voltage divider to improve the driving capability of the signal, and the second microprocessor samples the change of the AD value at the Vo voltage point through Pressure_AD to convert same into pressure change.

Figure 10:
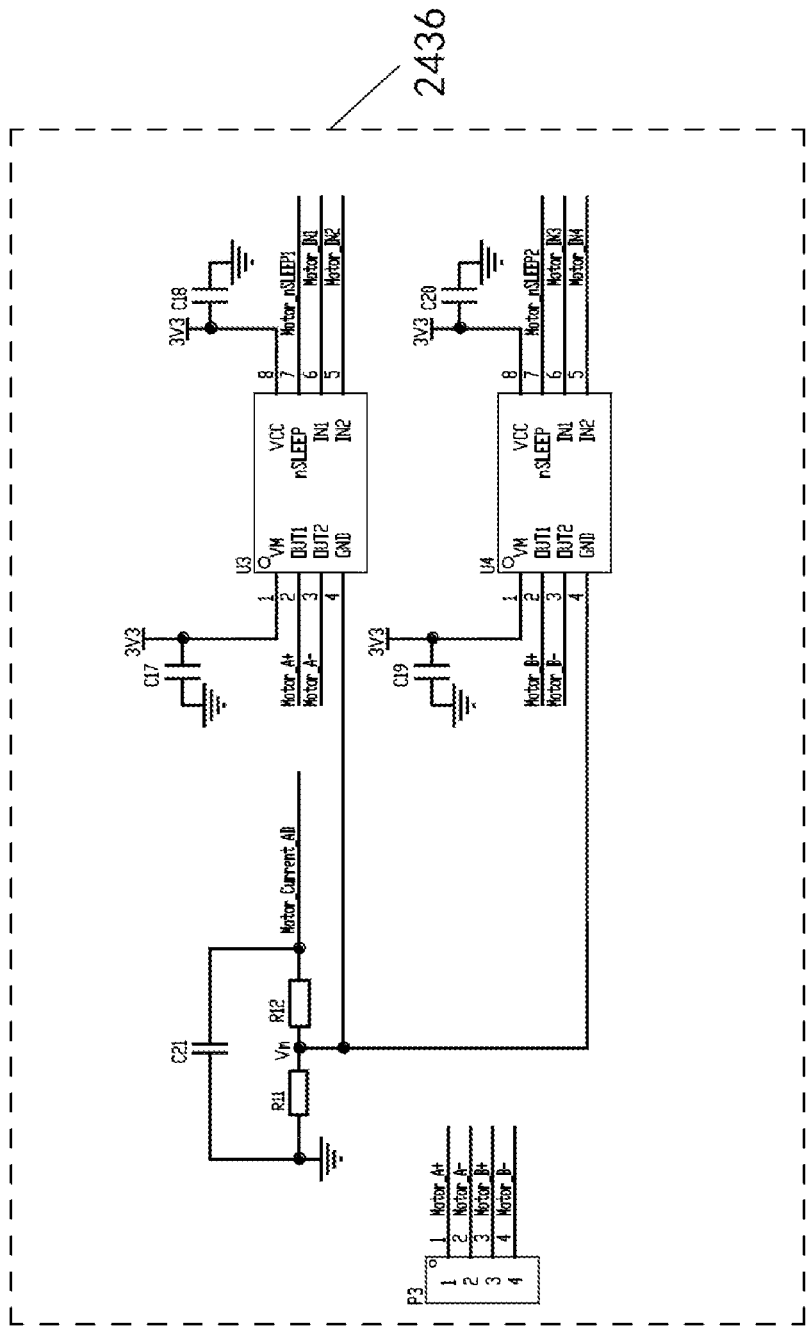
FIG. 10 is a schematic circuit diagram showing a drive mechanism according to an embodiment of the present invention.
Figure 11:
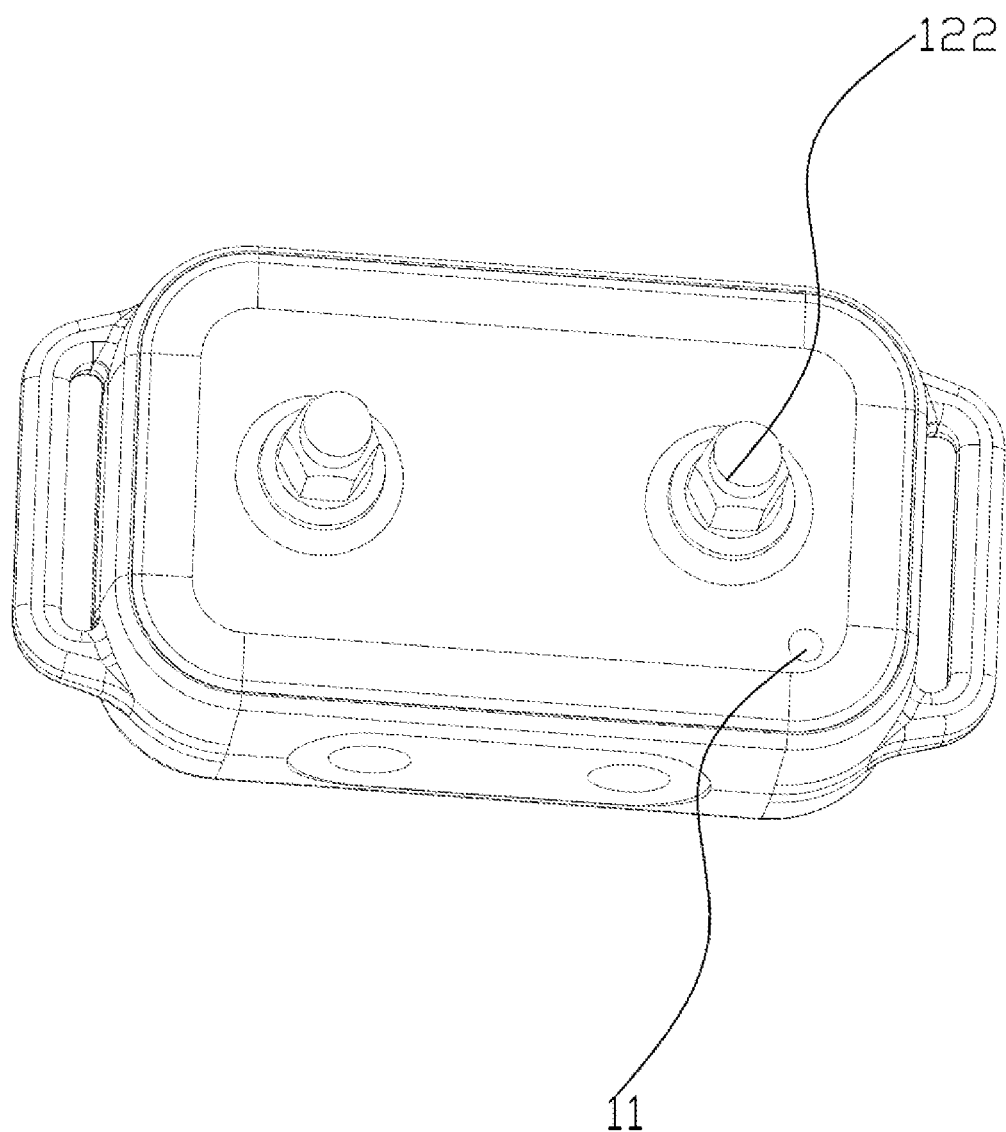
FIG. 11 is a schematic diagram showing a receiver portion according to an embodiment of the present invention.

With reference to FIG. 10, according to the circuit principle of the drive mechanism 2436, the lead screw motor uses a two-phase four-wire driving mode, the driving circuit uses two pieces of U3 and U4 single-path H-bridge motor driving chips SC8837C, and the second microprocessor 22 controls the forward, backward and braking operations of the stepping motor via Motor_IN1-Motor_IN4. P3 is the stepper motor wiring port and C17-C20 are the power supply decoupling capacitors. R11 is a current sampling resistor, providing a reference voltage at a Vm point, R12 is an isolation resistor, and C21 is a filter capacitor; when the current at the Vm point increases rapidly, the second microprocessor 22 sampling the AD value at the Vm voltage point via the Motor_Current_AD to increase, indicating that the motor has a stall phenomenon, and then the second microprocessor will stop the motor action, and back off a distance in the opposite direction.

A method for controlling interactive perceptual experience in dog training based on the device for controlling interactive perceptual experience in dog training, comprising: providing a receiver and a transmitter, wherein the receiver comprises a fixed device wearable on the neck of a pet dog, a training output device provided on the fixed device, a motion sensor, a first communication module and a first microprocessor, wherein the training output device is provided on the fixed device, and the transmitter is a hand-held remote-control perceiving device capable of perceiving an operation, and the remote-control perceiving device comprises a housing, a second microprocessor provided on the housing, a second communication module, a perception input module and a second vibration output module, a training intensity output is configured, wherein the training output operation of the training output device is configured with a plurality of training output modes with different intensity grades; and a training output signal is configured for a perception mode, wherein a perception input module of the training output operation is set to perform the training output operation with multi-grade press strengths with different intensities or multi-grade grip strengths with different intensities matching each graded intensity output of the training intensity output, and a second microprocessor converts received information about the press strength or the grip strength with different intensities of the perception input module into a training output signal with a corresponding intensity, the second microprocessor communicates the training output signal of the corresponding intensity input by the perception input module to the first communication module of the receiver via the second communication module; the first communication module receives a training output signal sent by the second microprocessor and sends the training output signal to the first microprocessor, and the first microprocessor controls according to the received training output signal, the training output device to perform training output operation of corresponding intensity on the pet dog, so that a dog trainer is capable of perceiving that a training output of corresponding intensity is desired to be performed on the pet dog through an input operation; and the motion sensor monitors in real time whether the training output device performs training output and sends detection information to the first microprocessor; the first microprocessor feeds back the detection information about the motion sensor to the second microprocessor of the transmitter through communication connection between the first communication module and the second communication module of the transmitter, and after receiving the detection information about the motion sensor fed back by the receiver, the second microprocessor controls the vibration output module to output a vibration of a corresponding grade to the dog trainer to feel a vibration of the same intensity as that of the pet dog according to the intensity of the training output signal.

In the present invention, the perception input module can also be one or more combinations of a grip input mechanism, a pressure input mechanism and a multi-grade adjustment key input mechanism; the microprocessor is a single chip microcomputer such as a STM 32L4 Cortex-M4 ultra-low power consumption single chip microcomputer or a STM32 U5 series Cortex-M33 ultra-low power consumption MCU; and the training output device can also be one or more combinations of vibration output, electrostatic pulse output, warning sound or ultrasonic wave for stimulating the pet dog to correct bad habits.

While this invention has been particularly shown and described with references to preferred embodiments thereof, it will be understood by a person skilled in the art that various changes in form and details may be made therein without departing from the spirit and scope of the invention as defined by the appended claims.

The invention claimed is:

1. A device for controlling interactive perceptual experience in dog training, comprising a receiver and a transmitter, wherein the receiver comprises a fixed device wearable on a neck of a dog, a training output device provided on the fixed device, a first communication module and a first microprocessor, and the transmitter is a hand-held remote-control perceiving device configured to perceive an operation comprising a housing, a second microprocessor provided on the housing, a second communication module and a perception input module, wherein the perception input module performs training output operations by means of press strengths or grip strengths with different intensities, the second microprocessor receives information on the press strengths or the grip strengths with the different intensities of the perception input module and converts the information into a training output signal of corresponding intensity; the second microprocessor communicates the training output signal of corresponding intensity input by the perception input module to the first communication module of the receiver via the second communication module; the first communication module receives the training output signal sent by the second microprocessor and sends the training output signal to the first microprocessor; and the first microprocessor controls, according to the training output signal, the training output device to perform a training output operation of corresponding intensity on the dog.

2. The device for controlling interactive perceptual experience in dog training according to claim 1, wherein the receiver further comprises a motion sensor provided in the training output device and configured to monitor whether the training output device performs training output of electrostatic pulses, vibrations and warning sounds, and to send detection information to the first microprocessor in real time, and the first microprocessor feeds back the detection information about the motion sensor to the second microprocessor of the transmitter through a communication connection between the first communication module and the second communication module of the transmitter.

3. The device for controlling interactive perceptual experience in dog training according to claim 2, wherein the hand-held remote-control perceiving device further comprises a vibration output module provided in the housing, the vibration output module is provided with a multi-grade vibration output mode corresponding to the press strengths or the grip strengths with the different intensities of the perception input module, and after receiving the detection information from the motion sensor fed back by the receiver, the second microprocessor controls the vibration output module to output a corresponding grade of vibration inductance according to the intensity of the training output signal.

4. The device for controlling interactive perceptual experience in dog training according to claim 3, wherein the vibration output module comprises a driving circuit and a cylindrical vibration motor, and the second microprocessor adjusts a rotation speed of the cylindrical vibration motor via the driving circuit to output different grades of vibration inductance.

5. The device for controlling interactive perceptual experience in dog training according to claim 1, wherein the perception input module comprises one or more combinations of a grip input mechanism, a pressure input mechanism, and a multi-grade adjustment key input mechanism.

6. The device for controlling interactive perceptual experience in dog training according to claim 5, wherein the grip input mechanism comprises a grip sensor and a press plate, a slot accommodating the grip sensor and the press plate is provided on a side of the housing, the grip sensor is embedded on the slot on the side of the housing, the press plate is attached outside the grip sensor and is covered on the slot on the side of the housing, and the grip sensor is connected to an input end of the second microprocessor.

7. The device for controlling interactive perceptual experience in dog training according to claim 5, wherein the grip input mechanism comprises a grip sensor and a press plate, a side of the housing is provided with a slot for accommodating the grip sensor and the press plate, the grip sensor is embedded on the slot of the side of the housing, the press plate is attached outside the grip sensor and is covered on the slot of the side of the housing, and the grip sensor is connected to an input end of the second microprocessor.

8. The device for controlling interactive perceptual experience in dog training according to claim 5, wherein the multi-grade adjustment key input mechanism comprises a key support, a key, an elastic mechanism, a support plate, a stop block and a drive mechanism, wherein the key is provided on a printed circuit board (PCB) and the key is connected to an input end of the second microprocessor, a part of the key support protrudes from a surface of the housing and passes through an upper surface of the housing, a bottom of the key support is provided on the key of the PCB via the elastic mechanism so that the key support is configured for pressing an operation and control key, a bottom of the elastic mechanism is provided with a support column movably passing through the PCB, and the support plate is provided in the housing below the support column of the elastic mechanism to support the support column, a bottom surface of the support plate is provided with a slope, the stop block is movably and transversely provided in the housing at a lower part below the support plate, an output shaft of the drive mechanism is connected to and drives the stop block to move horizontally and transversely in the housing, so that movement of the stop block drives the support plate to be lifted or lowered to adjust a compression strength of the elastic mechanism, so that when the key support is pressed to perform a training output operation input, there will be different textures, and the drive mechanism is connected to and controlled by the second microprocessor.

9. The device for controlling interactive perceptual experience in dog training according to claim 8, wherein the drive mechanism is a screw rod motor.

10. The device for controlling interactive perceptual experience in dog training according to claim 8, wherein an upper surface of the stop block is provided with a second slope opposite to and configured to the slope of the bottom surface of the support plate.

11. The device for controlling interactive perceptual experience in dog training according to claim 1, wherein the training output device comprises an electrostatic pulse, a vibration, a warning sound, or an ultrasonic stimulus to allow the dog to correct a habit.

12. The device for controlling interactive perceptual experience in dog training according to claim 11, wherein an electrostatic pulse output module is connected to the training output device, an output end of the electrostatic pulse output module is connected to a first microprocessor input end, the electrostatic pulse output module acquires an electrostatic pulse current value of a current electrostatic pulse shock column to be compared with a preset idle current threshold value by detecting whether the current electrostatic pulse shock column is in contact with skin to cause different loads, and electrostatic pulse training is successful when the electrostatic pulse current value of the current electrostatic pulse shock column is greater than the preset idle current threshold value.

13. The device for controlling interactive perceptual experience in dog training according to claim 1, wherein the hand-held remote-control perceiving device further comprises a display connected to the second microprocessor.

14. A method for controlling interactive perceptual experience in dog training, wherein the method comprises:
providing a receiver and a transmitter, wherein the receiver comprises a fixed device wearable on a neck of a dog, a training output device provided on the fixed device, a first communication module and a first microprocessor, the training output device is provided on the fixed device, and the transmitter is a hand-held remote-control perceiving device configured to perceive an operation, and the hand-held remote-control perceiving device comprises a housing, a second microprocessor provided on the housing, a second communication module and a perception input module;
configuring a training intensity output, wherein a training output operation of the training output device is configured with a plurality of training output modes with different intensity grades; and
configuring a training output signal for a perception mode, wherein a perception input module is set to perform the training output operation with multi-grade press strengths with different intensities or multi-grade grip strengths with different intensities matching each graded intensity output of the training intensity output, and the second microprocessor converts received information about the multi-grade press strengths with different intensities or the multi-grade grip strengths with different intensities of the perception input module into the training output signal with a corresponding intensity, the second microprocessor communicates the training output signal of the corresponding intensity input by the perception input module to the first communication module of the receiver via the second communication module; the first communication module receives a training output signal sent by the second microprocessor and sends the training output signal to the first microprocessor, and the first microprocessor controls according to the training output signal the training output device to perform a training output operation of corresponding intensity on the dog, so that a dog trainer is able to perceive that a training output of corresponding intensity is desired to be performed on the dog through an input operation.

15. The method for controlling interactive perceptual experience in dog training according to claim 14, wherein the receiver further comprises a motion sensor, and the hand-held remote-control perceiving device further comprises a vibration output module, the motion sensor monitors in real time whether the training output device performs training output and sends detection information to the first microprocessor, and the first microprocessor feeds back the detection information about the motion sensor to the second microprocessor of the transmitter through a communication connection between the first communication module and the second communication module of the transmitter; after receiving the detection information of the motion sensor fed back by the receiver, the second microprocessor controls the vibration output module to output a vibration inductance of a corresponding grade according to an intensity of the training output signal so that the dog trainer is able to feel the training output having the same intensity as that of the dog.

* * * * *